(12) United States Patent
Schlegel et al.

(10) Patent No.: US 8,783,966 B2
(45) Date of Patent: Jul. 22, 2014

(54) TAPERED ROLLER BEARING WITH CAGE

(75) Inventors: Thorsten Schlegel, Frankenbrunn (DE); Armin Necker, Stegaurach (DE); Werner Motzkus, Stuttgart (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/000,436

(22) PCT Filed: Feb. 6, 2012

(86) PCT No.: PCT/EP2012/051937
§ 371 (c)(1), (2), (4) Date: Aug. 20, 2013

(87) PCT Pub. No.: WO2012/113640
PCT Pub. Date: Aug. 30, 2012

(65) Prior Publication Data
US 2013/0322799 A1 Dec. 5, 2013

(30) Foreign Application Priority Data
Feb. 25, 2011 (DE) .......................... 10 2011 004 706

(51) Int. Cl.
*F16C 33/46* (2006.01)
*F16C 33/56* (2006.01)
*F16C 41/00* (2006.01)

(52) U.S. Cl.
USPC ............................ 384/572; 384/448; 384/576

(58) Field of Classification Search
CPC .. F16C 33/46; F16C 33/4605; F16C 33/4635; F16C 33/4652; F16C 33/4682; F16C 41/00; F16C 41/007
USPC .................................. 384/448, 572, 573, 576
See application file for complete search history.

(56) References Cited

U.S. PATENT DOCUMENTS

| 4,523,862 | A | * | 6/1985 | Yasui et al. | .................... 384/564 |
| 4,812,058 | A | * | 3/1989 | Hofmann et al. | ............. 384/563 |
| 2012/0163748 | A1 | * | 6/2012 | Henneberger et al. | ........ 384/564 |

FOREIGN PATENT DOCUMENTS

DE    4338350    5/1995
(Continued)

*Primary Examiner* — Phillip A Johnson
(74) *Attorney, Agent, or Firm* — Volpe and Koenig, P.C.

(57) ABSTRACT

A tapered roller bearing (1) with two coaxial bearing rings (2, 3) and a multiplicity of tapered rollers (4) which are arranged between the bearing rings (2, 3), are guided in a cage (10, 11, 12) and roll on raceways (7, 8) on the bearing rings (2, 3), with a rim (9) at the large diameter of the inner bearing ring (3), wherein the cage (10, 11, 12) is formed of side rings (10, 11) and webs (12) which connect them, with the formation of pockets (13) for the tapered rollers (4), and elastic projections (14) are arranged on one side ring (10), which projections (14) interact with the rim (9) and prestress the cage (10, 11, 12) with the tapered rollers (4) axially against the rim (9). In order to achieve play-free and constraint-free setting of the tapered rollers against the guide rim and to make it possible to apply or introduce active or passive transmission elements to the individual components of the tapered roller bearing, fewer projections (14) than pockets (13) are arranged on the side ring (10) which is close to the rim, preferably only in the region of every second pocket (13) in the case of an even number of pockets (13). An active or passive transmission element (20, 21, 22) is arranged on the rotating bearing ring (2, 3) and/or on the cage (10, 11, 12) and/or on at least one of the tapered rollers (4), and at least one sensor is arranged on a stationary component, which sensor interacts with said stationary component for monitoring the state of the kinematic conditions of the bearing (1) during operation.

11 Claims, 1 Drawing Sheet

(56) References Cited

FOREIGN PATENT DOCUMENTS

| | | | |
|---|---|---|---|
| DE | 4338350 A1 * | 5/1995 |
| EP | 494323 A1 * | 7/1992 |
| FR | 2925943 A1 * | 7/2009 |
| GB | 1223549 | 2/1971 |
| JP | 05273222 A * | 10/1993 |

* cited by examiner

TAPERED ROLLER BEARING WITH CAGE

FIELD OF THE INVENTION

The invention relates to a tapered roller bearing having two coaxial bearing rings and a multiplicity of tapered rollers, which are arranged between the bearing rings, are guided in a cage, and roll on raceways on the bearing rings, with a rim at the large diameter of the inner bearing ring, wherein the cage is formed of side rings and webs which connect them, with the formation of pockets for the tapered rollers, and elastic projections are arranged on one side ring, which projections interact with the rim and preload the cage with the tapered rollers axially against the rim.

BACKGROUND

DE 43 38 350 A1 describes a tapered roller bearing of this kind with a cage, wherein, in the pockets, the cage is provided at the small diameter with axial elastic means, which preload the rollers against the large rim, and at the large diameter with projections, which snap into a groove arranged on the inner bearing ring or behind a projection arranged on the inner bearing ring. The inner bearing ring has a rim only at the large diameter, and the elastic means on the cage are in the form of axial corrugations or segmented lips. This tapered roller bearing with a cage is supposed to be simple to install while being economical to manufacture without tolerance, friction and space problems and to allow reliable setting of the tapered rollers, ensuring that the tapered rollers are located immediately in the correct position as soon as the overall bearing has been assembled and installed in a machine.

This tapered roller bearing with a cage has proven its worth, but it has been found that it is desirable to reduce the preloading by the projections on the side ring of the cage on the side of the tapered rollers with the larger diameter in order to compensate for the effects of tolerances, e.g. the length tolerance of the rolling elements, the width tolerance of the cage pockets, the tolerance of the overall height of the bearing and the width tolerance of a twist-free movement for snapping in the radial cage projections.

SUMMARY

Given this background, it is the underlying object of the invention to provide a tapered roller bearing which retains the function of the tapered rollers preloaded ready for operation for an optimized installation process, as in the prior art, but which does not exhibit the resulting constraining forces during operation of the bearing.

The invention starts from a tapered roller bearing having two coaxial bearing rings and a multiplicity of tapered rollers, which are arranged between the bearing rings, are guided in a cage, and roll on raceways on the bearing rings, with a rim at the large diameter of the inner bearing ring, wherein the cage is formed of side rings and webs which connect them, with the formation of pockets for the tapered rollers, and elastic projections are arranged on one side ring, which projections interact with the rim and preload the cage with the tapered rollers axially against the rim. To achieve the stated object, provision is made for fewer projections than pockets to be arranged on the side ring which is close to the rim.

By reducing the number of projections relative to the number of pockets and hence the number of tapered rollers, the preloading force applied by the projections and, as a result, also the additional constraining forces are reduced. Moreover, the cage is simpler to manufacture, especially if it is designed as a plastic injection molding, since fewer projections are formed thereon.

For reasons of symmetry, the projections are arranged in a uniformly spaced manner on the side ring, preferably in the region of the pockets.

If the cage has an even number of pockets, a preferred possibility is for the projections to be arranged in the region of each second pocket on the side ring which is close to the rim.

An advantageous measure to improve the elasticity of the projections and to reduce the friction on the tapered rollers is to design the projections so that they are bent toward the rim and to make them pointed in a region of the ends thereof which interact with the rim.

Another measure to increase the elasticity of the projections and to make the side ring which is close to the rim torsionally elastic is to provide the side ring which is close to the rim with recesses in a region between the webs, on both sides of the projections.

The overall elasticity of the cage can be increased while simultaneously reducing friction if the side ring which is adjacent to the small diameter of the tapered rollers is of corrugated design in the region between the webs and rests by means of in each case one corrugation crest against the small end face of the associated tapered roller.

The symmetrical configuration of the cage makes it possible to arrange an active or passive transmission element on the rotating bearing ring and/or on the cage and/or on at least one of the tapered rollers, and to arrange at least one sensor on a stationary component, which sensor interacts with said stationary component for monitoring the state of the kinematic conditions of the bearing during operation, wherein the transmission element on the cage is preferably formed by a coating, preferably an electrically or magnetically acting coating, applied at least locally.

In particular, provision can be made for the transmission element on the cage to be formed by an electrically or magnetically acting, at least locally applied coating on at least one of the projections.

In this way, it is possible, in particular, to detect the rotational speeds of the individual components of the rolling contact bearing, e.g. of the rolling elements, of the cage and of the inner ring and to use them for monitoring the state of the bearing during operation.

BRIEF DESCRIPTION OF THE DRAWINGS

The invention is explained in greater detail below by means of an embodiment illustrated in the drawing. In the drawings.

DETAILED DESCRIPTION OF THE PREFERRED EMBODIMENTS

Figure 1:
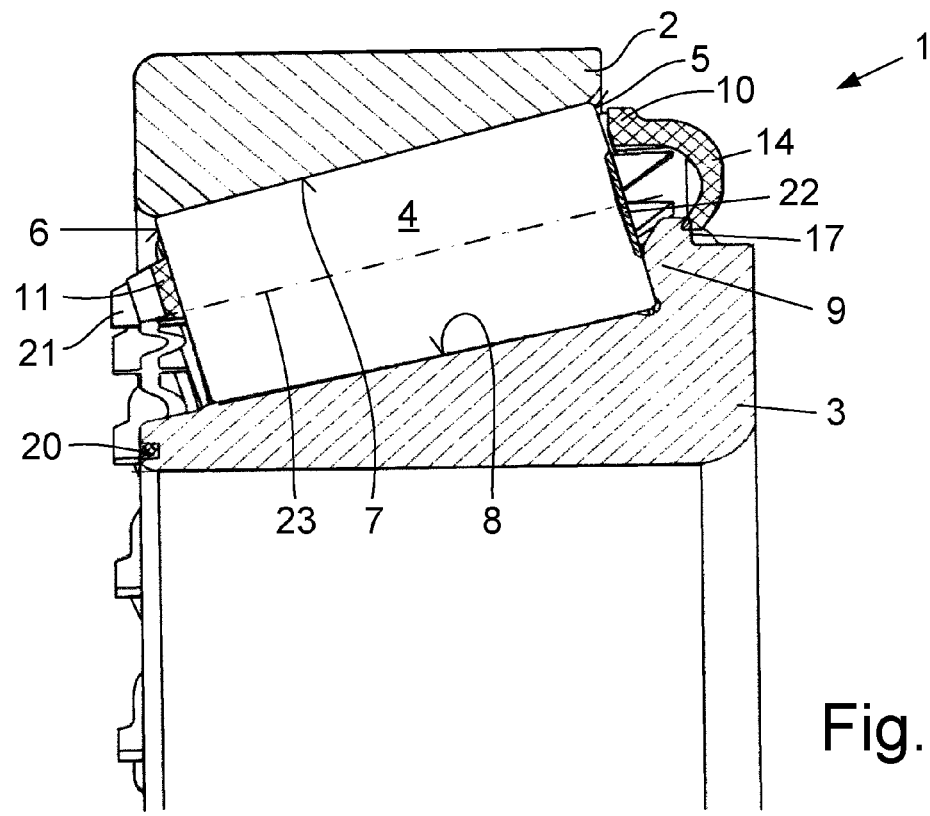
FIG. 1 shows an axial partial section through a tapered roller bearing according to the invention with a cage.
Figure 2:
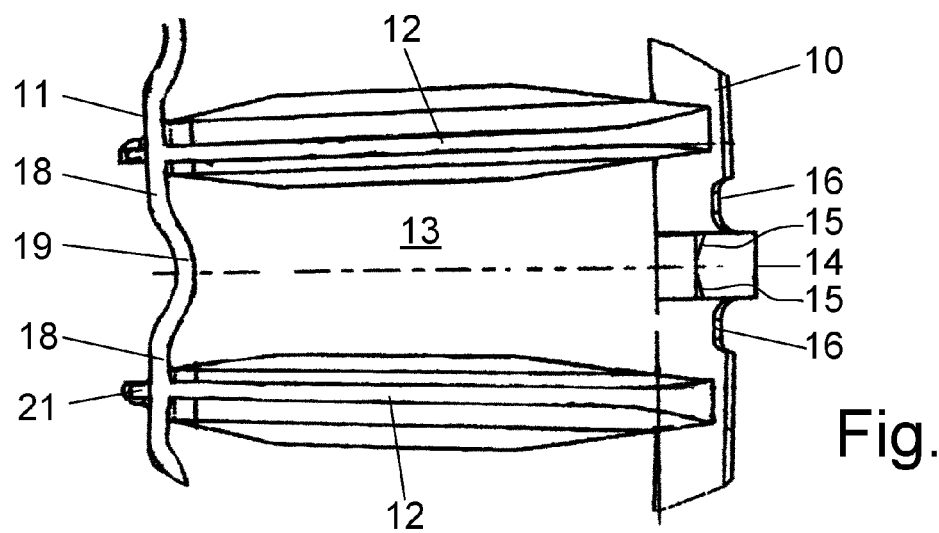
FIG. 2 shows a partial radial internal view of the cage in the tapered roller bearing shown in FIG. 1.

The tapered roller bearing 1 consists of an outer bearing ring 2 and of an inner bearing ring 3, between which are arranged tapered rollers 4, which roll on raceways 7, 8 of the bearing rings 2, 3 and are accommodated in a cage. The cage is formed of two side rings 10, 11 and of webs 12 connecting said side rings, wherein a pocket 12 for accommodating the tapered rollers 4 is formed between two adjacent webs 12 in each case. The tapered rollers 4 are supported by means of the large-diameter ends 5 thereof on a radially outward-pointing rim 9 on the inner bearing ring 3, while the small-diameter ends 6 merely rest on that side ring 11 of the cage which is remote from the rim. The webs 12 are arranged radially to the outside of the tapered roller axes 23 in order to be able to arrange the tapered rollers 4 as close together as possible and to increase the number of tapered rollers 4 in the bearing.

Radial projections 14 in the form of claws are formed integrally on the side ring 10 which is close to the rim, said claws engaging axially behind an offset 17 on the rim 9 of the inner bearing ring 3. The ends of the projections 14 which rest on the offset 17 are provided with flats 15 or designed to taper to a point in order to keep the contact surface with the offset 17 as small as possible, thereby reducing friction in this region.

The projections 14 are bent approximately in a semicircular shape toward the radial and the axial center of the bearing and are thinner toward the ends thereof which are provided with the flats 15, thereby increasing the elasticity thereof.

Another measure for increasing the elasticity of the projections 14 and for increasing the torsional elasticity of the side ring 10 which is close to the rim provides for axial recesses 16 to be introduced into the side ring 10 which is close to the rim, on both sides of the projections 14.

The side ring 11 which is remote from the rim is of corrugated design between the webs 12, wherein the webs 12 are connected to said side ring 11 at the corrugation troughs 18, while the corrugation crests 19 rest against the roller ends 6 and press the tapered rollers 4 axially against the rim 9. The corrugation crests 19 rest by means of a small, arched surface region against the smaller-diameter ends 6 of the tapered rollers 4, the ends remote from the rim, and therefore friction is reduced here too.

In the region of the webs 12, projections are arranged or formed on the side ring 11 which is remote from the rim, of which at least one is designed as a transmission element 21 in order to allow monitoring of the state of the kinematic conditions of the bearing during operation in interaction with a sensor (not shown) arranged on a housing for the tapered roller bearing or the like.

On the rotating bearing ring 3, it is possible to arrange a transmission element 20 comparable thereto, and a transmission element 22 can likewise be arranged on at least one tapered roller 4 or on at least one of the projections 14 of the cage. The transmission elements are preferably designed as an electrically or magnetically acting coating.

By use of appropriate sensors, it is possible in this way to determine the rotational speeds of the individual components, namely of the rotating bearing ring 3, of the tapered rollers 4 and/or of the cage 10, 11, 12 and, from these, to draw conclusions about the kinematic conditions and the state of the bearing during operation.

LIST OF REFERENCE SIGNS 1 tapered roller bearing
2 outer bearing ring
3 inner bearing ring
4 tapered rollers
5 end of the tapered roller
6 end of the tapered roller
7 raceway
8 raceway
9 rim
10 side ring
11 side ring
12 webs
13 pockets
14 projections
15 flats
16 recesses
17 offset
18 corrugation troughs
19 corrugation crest
20 transmission element
21 transmission element
22 transmission element
23 tapered roller axis

The invention claimed is:

1. A tapered roller bearing comprising two coaxial bearing rings, a multiplicity of tapered rollers arranged between the bearing rings, the tapered rollers are guided in a cage and roll on raceways on the bearing rings, a rim located at a large diameter of the inner bearing ring, the cage is formed of side rings and webs which connect the side rings to form pockets for the tapered rollers, and elastic projections are arranged on one of the side rings, said projections interact with the rim and preload the cage with the tapered rollers axially against the rim, and fewer projections than pockets are arranged on the side ring which is close to the rim.

2. The tapered roller bearing as claimed in claim 1, wherein the projections are arranged in a uniformly spaced manner on the side ring which is close to the rim.

3. The tapered roller bearing as claimed in claim 1, wherein the projections are arranged in a region of the pockets on the side ring which is close to the rim.

4. The tapered roller bearing as claimed in claim 3, wherein the projections are arranged on the side ring which is close to the rim only in a region of each second one of the pockets in the case of an even number of pockets.

5. The tapered roller bearing as claimed in claim 1, wherein the projections are bent and are pointed in a region of ends thereof which interact with the rim.

6. The tapered roller bearing as claimed in claim 1, wherein the side ring which is close to the rim is provided with recesses in a region between the webs, on both sides of the projections.

7. The tapered roller bearing as claimed in claim 1, wherein the side ring which is remote from the rim is of corrugated design in a region between the webs and rests by a corrugation crest against small end faces of the tapered rollers.

8. The tapered roller bearing as claimed in claim 1, wherein the cage is a plastic injection molding.

9. The tapered roller bearing as claimed in claim 1, wherein an active or passive transmission element is arranged on at least one of the rotating bearing ring, the cage, or at least one of the tapered rollers, and at least one sensor is arranged on a stationary component, said sensor interacts with said stationary component for monitoring a state of kinematic conditions of the tapered roller bearing during operation.

10. The tapered roller bearing as claimed in claim 9, wherein the transmission element on the cage is formed by an electrically or magnetically acting coating applied at least locally.

11. The tapered roller bearing as claimed in claim 9, wherein the transmission element on the cage is formed by an electrically or magnetically acting, at least locally applied coating on at least one of the projections.

* * * * *